(12) United States Patent
Zhao et al.

(10) Patent No.: US 8,546,486 B2
(45) Date of Patent: Oct. 1, 2013

(54) LOW VOC THERMOSETTING POLYESTER ACRYLIC RESIN FOR GEL COAT

(75) Inventors: Ming Yang Zhao, Kansas City, MO (US); Chih-Pin Hsu, Kansas City, MO (US); Frederic Bauchet, Liberty, MO (US); Jeremy Warren, Shawnee, KS (US)

(73) Assignee: CCP Composites US LLC, North Kansas City, MO (US)

( * ) Notice: Subject to any disclaimer, the term of this patent is extended or adjusted under 35 U.S.C. 154(b) by 275 days.

(21) Appl. No.: 12/062,849

(22) Filed: Apr. 4, 2008

(65) Prior Publication Data
US 2009/0076218 A1  Mar. 19, 2009

Related U.S. Application Data

(60) Provisional application No. 60/973,315, filed on Sep. 18, 2007.

(51) Int. Cl.
  C08G 63/46 (2006.01)
  C08G 63/00 (2006.01)
  C08L 67/00 (2006.01)

(52) U.S. Cl.
  USPC .......... 525/34; 525/42; 525/43; 525/49; 528/297; 528/300

(58) Field of Classification Search
  USPC .......... 522/107; 525/33–49; 528/272–307
  IPC ........................................ C08F 290/06
  See application file for complete search history.

(56) References Cited

U.S. PATENT DOCUMENTS

| | | | |
|---|---|---|---|
| 3,899,611 A | | 8/1975 | Hall |
| 4,096,323 A * | | 6/1978 | Wegemund et al. ..... 526/318.42 |
| 4,102,944 A * | | 7/1978 | Fukuyama et al. ............. 525/10 |
| 4,465,718 A * | | 8/1984 | Gruber ............................. 528/49 |
| 4,703,101 A * | | 10/1987 | Singer et al. .................... 528/87 |
| 4,742,121 A | | 5/1988 | Toman |
| 4,774,267 A | | 9/1988 | Weintraub |
| 4,831,066 A | | 5/1989 | Weintraub |
| 5,002,976 A * | | 3/1991 | McConnell et al. .......... 522/107 |
| 5,118,783 A * | | 6/1992 | Raju ............................. 528/274 |
| 5,464,885 A * | | 11/1995 | Craun ........................... 523/423 |
| 5,494,980 A * | | 2/1996 | Buter et al. .................... 525/455 |
| 5,777,053 A | | 7/1998 | McBain et al. |
| 6,344,503 B1 * | | 2/2002 | Nkansah et al. .............. 523/500 |
| 6,492,470 B2 | | 12/2002 | Crump et al. |
| 6,583,218 B1 * | | 6/2003 | Airola et al. ..................... 525/25 |
| 6,617,417 B1 * | | 9/2003 | Airola et al. .................. 528/272 |
| 6,900,276 B2 | | 5/2005 | Crump et al. |
| 7,150,915 B2 | | 12/2006 | Kia et al. |
| 2005/0256278 A1 * | | 11/2005 | Crump et al. .................. 525/531 |
| 2006/0182975 A1 * | | 8/2006 | Burbank et al. .............. 428/420 |

FOREIGN PATENT DOCUMENTS

| | | |
|---|---|---|
| EP | 254232 A2 | 1/1988 |
| EP | 708157 A2 | 4/1996 |
| EP | 1149874 A1 | 10/2001 |
| JP | 59157074 | 9/1984 |
| JP | 60123478 | 7/1985 |
| JP | 63113011 | 5/1988 |
| JP | 08188628 A * | 7/1996 |
| JP | 2001011153 | 1/2001 |
| WO | 2004014978 A1 | 2/2004 |
| WO | 2004056930 A1 | 7/2004 |

OTHER PUBLICATIONS

Gelcoats. Encyclopedia of Material: Science and Technology: vol. 10 T-Z. 2001. Elsevier.p. 9212.*
Machine translated English equivalent of JP 08188628 A.*
CAPlus Abstract of JP 08-188628 (AN 1996:589750), 2 pages.*
Machine Translated English equivalent of JP 08188628 (Jul. 1996, 6 pages).*

* cited by examiner

*Primary Examiner* — Ling Choi
*Assistant Examiner* — Brieann R Fink
(74) *Attorney, Agent, or Firm* — Whyte Hirschboeck Dudek S.C.

(57) ABSTRACT

Low VOC thermosetting polyester acrylic resins are made by esterification of unsaturated epoxide such as glycidyl methacrylate, and a polyacid which is the half-ester formed by reacting an acid or its anhydride with a polyol is disclosed. The obtained low viscosity resin is useful for making a low or zero VOC gel coat with excellent hydrolytic and weather resistance.

22 Claims, No Drawings

LOW VOC THERMOSETTING POLYESTER ACRYLIC RESIN FOR GEL COAT

CROSS-REFERENCE TO RELATED APPLICATION

This application claims the benefit of pending U.S. Provisional Patent Application No. 60/973,315 entitled "Low VOC Thermosetting Polyester Acrylic Resin for Gel Coat" filed on Sep. 18, 2007, which is hereby incorporated by reference herein.

FIELD OF THE INVENTION

This invention is in the field of gel coat compositions, components for making gel coat compositions, processes for making gel coat compositions for use in making gel coated articles, process for making gel coated articles, and gel coated articles.

BACKGROUND OF THE INVENTION

Conventional gel coat compositions, typically formulated from thermosetting resins such as unsaturated polyester, acrylate, and urethane type resins and combinations thereof are useful as the exterior paint layer for composite materials such as boat hulls, bath tub enclosures, and the like. A gel coat is a pigmented, filled, and pre-promoted resin (usually polyester) which is sprayed with an initiator onto molds from a high pressure spray gun to a film thickness of up to 0.75 mm. The film cures prior to reinforcement with glass fibers and laminating resins. The gel coat should exhibit low viscosity at high shear, should resist sagging, and produce a gel time of 8-15 minutes. For marine applications the gel coats should exhibit hydrolytic stability and good weatherability.

Unsaturated polyester resins are generally prepared by reacting in a glycol with an unsaturated acid and are then mixed with polymerizable diluents such as styrene and methyl methacrylate (MMA). The reactive diluents are also used to reduce resin system viscosity. When cured, the reactive diluents become a part of the resin system to produce a rigid cross-linked structure with desirable properties. Conventional unsaturated polyester resin usually contains 45%-35 weight % of reactive diluents and other volatile organic compounds (VOC).

The presence of large amounts of styrene and other VOC in such resin compositions results in the emission of styrene vapors into the work atmosphere which constitutes a hazard to workers and the environment. In view of this environmental hazard, governments have established regulations setting forth guidelines relating to volatile organic compounds which may be released to the atmosphere. The U.S. Environmental Protection Agency (EPA) has established guidelines limiting the amount of VOC released to the atmosphere, such guidelines being scheduled for adoption or having been adopted by various states of the United States. Guidelines relating to VOC, such as those of the EPA, and environmental concerns are particularly pertinent to the gel coat and other coating industry which use styrene or organic solvents and these VOC are emitted into the atmosphere.

To reduce styrene content and VOC in polymeric vehicles and formulated coating, researchers try to develop low VOC resin compositions in which VOC in the coating is kept at the lowest possible level. One way to reduce VOC is to reduce the molecular weight of the resin. According to polymer physics theory, the viscosity of polymers in the liquid state depends mainly on the average molecular weight, so it is desirable to reduce average molecular weight for low VOC product. Low molecular weight leads to a lower viscosity and lower styrene need. Compared with conventional resin, which has higher molecular weight and higher styrene content, the low VOC resin usually contains 35% or less styrene and VOC.

The lower molecular weight resin has the advantage of reduced VOC, but it also has disadvantages over the conventional resin. The coating or gel coat made with lower molecular weight resin tends to have poor properties in application compared to the conventional resin. While the conventional resin tends to form a tack-free curing surface, the coating or gel coat made with lower molecular weight resin tends to remain tacky for long periods of time after application. The surface tackiness is because of the oxygen inhibition on radical polymerization.

To get a non-tacky coating, for example, a film-forming material, such as paraffin wax may be included in the coating composition in order to prevent air inhibition and reduce the monomer vaporization. Paraffin or hydrocarbon waxes tend to migrate to the surface of the coating and serve as a film which reduces oxygen penetration at the coating surface. However, the presence of wax on coating surface will reduce secondary adhesive properties when laminate is put onto the coating later.

Low VOC and performance are incompatible characteristics with each other. The improvement of the poor performance and obtaining a tack-free tends to impair the low VOC property. There is a difficulty in attaining both low VOC and good application property.

It is desirable, particularly in view of the toxicity of the styrene monomer and government regulations, to reduce the concentration levels of the styrene monomer from the usual 40% to 50% by weight of the polyester resin to below 35% or 30% by weight. However, reductions in styrene monomer concentrations present problems in the polyester resins. The resin viscosity increases at lower monomer content causing difficulties in applying the resins, such as poor spray property and glass roll-out when the resin is sprayed or used in conjunction with glass fibers. In addition, the physical properties of the styrene monomer-reduced polyester resins are also greatly reduced without the use of additional, supplemental cross linkers in the polyester resin. Acrylic monomers, such as ethylene glycol dimethacrylate have been added to low or reduced styrene monomer polyester resins for marine grade gel coats and for outdoor applications. However, the result resin is hard to use because of a tacky surface.

In addition, in unsaturated polyester resin an aromatic diacid, such as isophthalic acid, is generally present to help improve the hydrolysis resistance of the film. However, the presence of the aromatic nuclei causes poor exterior durability to the coating film. The same problem is also presented in vinyl ester resins. Low VOC vinyl esters based on aromatic polyepoxide resin reacted with unsaturated monocarboxylic acid and other moieties are reported in U.S. Pat. No. 6,900,276. While the content of styrene is lower, the presence of the aromatic nuclei leads to unacceptable exterior durability. The vinyl ester based on aliphatic polyepoxides show poor hydrolysis resistance. Both of these vinyl ester resins are not suitable for gel coats requiring good hydrolytic stability and weatherability.

It is therefore desirable to provide new and improved, crosslinkable resin compositions to provide unsaturated, cured resins with better physical and chemical properties and to provide an unsaturated resin composition having reduced styrene monomer at the same time. Several approaches for addressing these limitations have been described in the prior art. These approaches include making polyester modifications using epoxy chemistry, urethane chemistry and acrylic chemistry.

Acrylic resin without aromatic nuclei show good properties and are developed for many applications including gel coat. Some acrylic base resins have been reported for gel coat formulation. Acrylic modified unsaturated resins are taught in EP708157. U.S. Pat. Nos. 4,742,121 and 6,492,470 teaches acrylic resins for gel coat comprising a vinyl monomer and a polyacrylate with various pendant unsaturated group.

The acrylic resins with urethanes have been reported via various techniques. U.S. Pat. Nos. 5,777,053 and 7,150,915, JP59157074, EP0254232, and WO2004014978 teach the acrylic polymers which contain urethane groups and are cross-linkable by vinyl polymerization. The urethane groups are introduced by reacting hydroxyl group pendant from the acrylate or polyester backbone with polyisocyanate.

WO2004056930 reported UV-curable epoxy acrylates. JP60123478 reported the isocyanuric ring-containing acrylate resin. Thermosetting acrylic resins were also synthesized with the reaction of polyacid and unsaturated epoxide such as glycidyl methacrylate. U.S. Pat. Nos. 4,774,267, and 4,831,066 reported the halfester of polyol and acid anhydride was esterified with glycidyl methacrylate for a photocurable dental material. JP63113011 and JP2001011153 reported ink or UV-cure coating composition made by the reaction of halfester of glycol and acid anhydride with glycidyl methacrylate.

While these approaches have led to improvements in hydrolytic stability and durability, none of these solutions to the problem arising from low viscosity and poor application properties have been totally satisfactory. There remains a significant need for thermosetting resin which has better cured product, especially in the case of low VOC resins, which contain relatively low volatile vinyl monomers, and with outstanding weather resistant.

It is an object of the present invention to provide a novel cross-linkable resin composition which avoids the problems of high VOC and provide gel coat which can be used in a wide variety of applications. It is a further object of the present invention to provide a cross-linkable polyester acrylic resin composition which can be formulated to a high solids gel coat composition with excellent weather, gloss and water resistance enabling the gel coat composition to be used as low VOC gel coats or in-mold coating system, particularly for use as an gel coat for boat and automobiles.

The above deficiencies of gel coats have been largely overcome with the gel coats based on the polyester acrylic resins of the present invention. The new polyester acrylic gel coats show low viscosity and excellent hydrolytic and weathering stability.

SUMMARY OF THE INVENTION

In accordance with the present invention, a cross-linkable resin composition comprising a reaction product of a polyacid, which is a half-ester formed from reacting an acid or its anhydride with a polyol, and an unsaturated epoxide is provided. The cross-linkable resin composition also contains polymerizable vinyl monomer. The polyester acrylic polymer, which contains less than 10 weight % aromatic component, preferably contains no aromatic ring, can be tailor made without forming high molecular weight materials enabling the formulation of high solids gel coat compositions which provide cured coatings with excellent properties. The half-ester synthesis process is not only good for preparing a desired molecular structure but also is convenient to introduce functional groups into the polymer backbone. The polyester acrylic polymer contains acrylic ester groups and secondary hydroxyl groups. The hydroxyl group may be used for further modification of the resin. The resin compositions can be used in making gel coat and in-mold coating with less amount of monomer.

The inventive resin compositions have at least two acrylate carbon-carbon double bonds in each molecule and polymerizable vinyl monomer. The polyester acrylic polymers are derived from the reaction product of:

(1) A polyol having at least two hydroxyl groups;
(2) A polyacid or its anhydride; and
(3) An unsaturated epoxide containing a carbon-carbon double bond.

The resulting resin composition has a viscosity of less than about 1500 cp in styrene at 70% non-volatile matter. The polyester acrylic polymer has a number average molecular weight of 560 to 2500. The polyol has a hydroxyl number of from about 56 to 1830, and has a number average molecular weight between 92 and 2000.

A further aspect of invention relates to gel coat derived from the above polyester acrylic resin compositions and to articles of manufacture, particularly boats and sanitary formed with the above-described resin compositions and having improved hydrolytic and weathering characteristics.

DETAILED DESCRIPTION OF THE INVENTION

The first step in making the polymer of this invention is to prepare a saturated polyol or use a commercial saturated polyol. The polyol compound is an organic compound containing at least two hydroxyl groups.

The second step in making the resin of this invention is to make a polyacid or half-ester from the above saturated polyol by reacting the polyol with the polyacid or its anhydride.

The third step in making the resin of this invention is to make a polymer from the above saturated polyacid by reacting polyacid with the unsaturated epoxide, such as glycidyl methacrylate and glycidyl acrylate. The resulting polymer can have a number average molecular weight in the range from about 560 to about 2500, preferably from about 800 to about 2000. If the molecular weight is less than about 560 the curing and gel coat properties will be poor. If molecular weight is higher than about 2500 the result resin will have high viscosity and can not be used to make low VOC gel coat.

Lastly, a styrene or vinyl monomer is added until the solution has reached a predetermined viscosity, which is less than about 1500 centipoise, preferably less than about 1000 centipoise as measured by Brookfield viscometer at 25° C.

The resulting polymer can be further crosslinked with various cross-linking agents, such as monofunctional and multifunctional methacrylates and acrylates, as well as other monomers, oligomers, and polymers capable of participating in free-radical addition polymerizations such as styrene, vinyl toluene, alpha methyl styrene, acrylic monomers etc.

The polyester acrylic resins of this invention are made by reacting a polyol having at least two hydroxyl groups per molecule (also called polyol herein), a polybasic acid or its anhydride and an unsaturated epoxide in limited ratios.

The preferred polyacids are ester group-containing oligomers formed from reacting polyols and 1,2-acid anhydrides. The half-esters are preferred because they are easy to obtain with a relatively low molecular weight and are quite reactive with epoxy functionality enabling the formation of resin compositions while maintaining outstanding properties.

Among the polyols which can be used are simple polyols, that is, those containing from about 2 to about 20 carbon atoms as well as polymeric polyols such as polyester polyols, polyurethane polyols, polyether polyols and acrylic polyols. Suitable polyol or polyhydroxyl compounds have an average of at least two hydroxyl groups in the molecule, a hydroxyl number of from about 56 to about 1830, and number average molecular weight of about 92 to about 2000. Examples of suitable polyol or polyhydroxyl compounds include hexanediols, di-, tri- and tetraethylene glycol, di-, tri- and tetrapropylene glycol, neopentyl glycol, 2-ethyl-1,3-hexanediol, 2,2,4-trimethyl-1,3-pentanediol, 1,4-bis(hydroxymethyl)-cyclohexane, 2,2-bis(4-hydroxycyclohexyl)propane, trimethylolpropane, glycerol, hexanetriol, N,N',N"-tris-(2-hydroxyethyl)-isocyanurate (THEIC) and pentaerythritol.

Examples of relatively high molecular weight polyhydroxyl compounds include the known polyester polyols obtained by reacting dicarboxylic acids or its anhydride such as hexahydrophthalic anhydride, nadic anhydride, tetrahydrophthalic anhydride with polyols such as those mentioned above.

Mixtures of the above mentioned starting materials may, of course, also be used for carrying out the process according to the invention. Other suitable polyol compounds include those compounds derived from the polyol/caprolactone adduct.

Preferred polyols are the polyhydric alcohols with three or four hydroxyl group, especially polycaprolactone triol (also known as Tone-polyol) having a hydroxyl number of from about 130 to about 1200 and a number average molecular weight between about 190 and about 1800. The Tone polyols may be obtained from the reaction of a lactone such as epsilon-caprolactone and a polyol such as ethylene glycol, diethylene glycol and trimethylolpropane (TMP). The Tone polyol can be prepared in a separate prior reaction or in situ in the same reaction vessel as the esterification reaction. Preparation of Tone polyol is known in the art and is disclosed, for example, in JP60123478, incorporated herein by reference.

The oligomeric aliphatic polyester diol may also be synthesized by the reaction of an aliphatic lactone, such as caprolactone, with an aliphatic diol. In one embodiment, the oligomeric aliphatic polyester diol has a number average molecular weight of about 180 to about 2,000. Preferably, the number average molecular of polyol is in the range of about 190 to about 1800. Suitable techniques for preparing the oligomeric polyester diols include those known in the art for preparation of polyesters. Suitable oligomeric aliphatic polyester diols are commercially available as, for example, DESMOPHEN® S1015-120 from Bayer (formerly sold as RUCOFLEX S1015-120), and Tone™ 301 from Dow.

In one embodiment, the polyol compound comprises an oligomeric aliphatic polycarbonate diol. An oligomeric aliphatic polycarbonate diol is a reaction product of a diol, and a carbonate precursor. The carbonate precursor may include phosgene, a haloformate, or a carbonate ester. Suitable diols are the same as those described above for the oligomeric aliphatic polyester diol. In one embodiment, the oligomeric aliphatic polycarbonate diol has a number average molecular weight of about 200 to about 2,000. Suitable techniques for preparing the oligomeric polycarbonate diols include those known in the art for preparation of polycarbonates, generally.

In one embodiment, the polyol compound comprises an oligomeric aliphatic polyestercarbonate diol. Such compounds are essentially hybrids of the oligomeric aliphatic polyester diols and oligomeric aliphatic polycarbonate diols described above, in that they contain two terminal hydroxy groups and internal carbonate linkages and ester linkages. In one embodiment, the oligomeric aliphatic polyestercarbonate diol has a number average molecular weight of at least about 200. The oligomeric aliphatic polyestercarbonate diols may be prepared from a diol, a diacid, and a carbonate precursor, using techniques known in the art for the preparation of polyestercarbonates. Suitable oligomeric aliphatic polyestercarbonate diols are available, such as, for example, DESMOPHEN® VP LS 2391 (formerly sold as DESMOPHEN® C200) from Bayer.

Besides polyester polyols, polyurethane polyols such as polyester-urethane polyols which are formed by reacting an organic polyisocyanate with a polyester polyol such as those described above can be used. The organic polyisocyanate is reacted with a polyol so that the OH/NCO equivalent ratio is greater than 1:1 so that the resultant product contains free hydroxyl groups. The organic polyisocyanate which is used in preparing the polyurethane polyols can be an aliphatic or aromatic polyisocyanate or a mixture. Diisocyanates are preferred, although higher polyisocyanates such as triisocyanates can be used, but they do result in higher viscosities.

The oligomeric aliphatic polyurethane diol may also be prepared according to procedures known in the art for preparing polyurethanes. Suitable oligomeric aliphatic polyurethane diols are commercially available as, for example, K-FLEX® UD-320 from King Industries. These urethane diols are the reaction products of carbonates and amines.

In one embodiment, the polyol compound comprises any of the diol compounds described above in combination with a triol compound. Suitable triol compound include, for example, the trifunctional, oligomeric polycaprolactones available as Tone™ 301, Tone™ 305 and Tone™ 310 from Dow, and the aliphatic polyester triol available as DESMOPHEN® F2037-420 from Bayer. The weight ratio of the diol compound to the triol compound may be about 1:99 to about 99:1, specifically about 20:80 to about 80:20.

Hydroxyl groups in the above-mentioned polyol may be at least partly silylated. By silylation of hydroxyl groups, the viscosity of the coating material can be further lowered. By silylating not less than about 20 mol %, preferably not less than about 50 mol % of the existing hydroxyl groups, the effect of lowering the viscosity can be further increased.

The half-ester (or polyacid) is obtained by reaction between a polyol and a 1,2-acid anhydride under conditions sufficient to ring open the anhydride forming the half-ester with substantially no polyesterification occurring. Such reaction products are of relatively low molecular weight with narrow molecular weight distributions and provide low volatile organic contents in the coating composition while still providing for excellent properties in the resultant coating. By substantially no polyesterification occurring means that the carboxyl groups of the anhydride from ring opening reaction are not esterified by the polyol in a recurring manner. Less than about 10 percent, preferably less than about 5 percent by weight of the free carboxyl groups are reacted.

Two reactions may occur in combining the anhydride and the polyol together under suitable reaction conditions. The desired reaction mode involves ring opening of the anhydride ring with the hydroxyl of a polyol. Subsequently, carboxyl groups formed by opening of the anhydride ring may react with hydroxyl groups to give off water via condensation reaction. This latter reaction is not desired since it can lead to a polycondensation reaction leading to products with higher molecular weights.

To achieve the desired reaction, the 1,2-acid anhydride and polyol are co-reacted together by mixing the two ingredients together in a reaction vessel. Preferably, the reaction is conducted in the presence of an inert atmosphere such as nitrogen and with or without the presence of a solvent to dissolve the solid ingredients and to lower the viscosity of the reaction mixture. Examples of suitable solvents are high boiling materials and include, for example, ketones such as methyl amyl ketone, diisobutyl ketone, methyl isobutyl ketone, aromatic hydrocarbons such as toluene and xylene.

The half-ester (or polyacid) can also be obtained by reacting a polyol with a polycarboxylic acid through esterification. The esterification requires elevated temperature and removing of reaction water by distillation. However, these conditions can promote undesired polyesterification. In order to minimize the polyesterification, the reaction temperature is preferably no greater than about 150° C., most preferably less than about 130° C. The reaction temperature for making the half-ester is usually within the range of 90°-125° C., preferably 100°-120° C. A temperature greater than about 150° C. is undesirable because it promotes polyesterification. A temperature less than about 70° C. is also undesirable because of sluggish reaction rates. The time of reaction can vary somewhat depending principally upon the temperature of reaction. Usually the reaction time will be from as low as 10 minutes to as high as 24 hours.

The equivalent ratio of anhydride to hydroxyl on the polyol is preferably at least about 0.8:1 (the anhydride being considered monofunctional) to obtain maximum conversion to the desired half-ester, being equivalent to an acid to hydroxyl equivalent ratio of (0.8×2):1 or 1.6:1 based on the reaction between a polyol and a 1,2-acid anhydride to form the polyacid half-ester. Ratios less than 0.8:1 can be used but such ratios result in increased formation of less preferred half-esters.

Among the anhydrides which can be used in the formation of the desired polyacids are those which, exclusive of the carbon atoms and anhydride moiety, contain from 2 to about 30 carbon atoms. Examples include aliphatic, cycloaliphatic, olefinic and cycloolefinic anhydrides. Substituted aliphatic anhydrides are also included within the definition of aliphatic provided the substituents do not adversely affect the reactivity of the anhydride or the properties of the resultant polyester. Examples of substituents would be chloro, alkyl and alkoxy. Examples of anhydrides include succinic anhydride, methylsuccinic anhydride, dodecenyl succinic anhydride, octadecenyl succinic anhydride, phthalic anhydride, tetrahydrophthalic anhydride, methyltetrahydrophthalic anhydride, hexahydrophthalic anhydride, alkylhexahydrophthalic anhydrides such as methylhexahydrophthalic anhydride, tetrachlorophthalic anhydride, endomethylene tetrahydrophthalic anhydride, chlorendic anhydride, itaconic anhydride, citraconic anhydride, nadic anhydride and maleic anhydride.

The half-esters are relatively low in molecular weight and quite reactive with epoxies enabling the formulation of high solids, fluid compositions while maintaining outstanding properties such as adhesion, gloss and water resistance.

The result polyacid then are reaction with ethylenically unsaturated monomers containing epoxy groups. Examples of ethylenically unsaturated monomers containing epoxy groups are those containing 1,2-epoxy groups and include glycidyl acrylate, glycidyl methacrylate (GMA) and allyl glycidyl ether.

An esterification catalyst is not required; however, the use of such a catalyst is highly desired. In general, any esterification catalyst is suitable for use to prepare vinyl esters including the metal hydroxides such as sodium hydroxide; tin salts such as stannous octoate; phosphines such as triphenyl phosphine; the onium salts such as the phosphonium salts, including the phosphonium and ammonium halides.

Preferred esterification catalysts comprise the onium salts, and preferably those containing phosphorus, sulfur or nitrogen, such as, for example, the phosphonium, sulfonium and ammonium salts of inorganic acids. Examples of these include, among others, benzyltrimethylammonium sulfate, tetramethylammonium chloride, benzyltrimethylammonium sulfate, tetramethylammonium chloride, benzyltrimethylammonium nitrate, diphenyldimethylammonium chloride, benzyltrimethylammonium chloride, diphenyldimethylammonium nitrate, diphenylmethylsulfonium chloride, tricyclohexylsulfonium bromide, triphenylmethylphosphonium iodide, diethyldibutylphosphonium nitrate, trimethylsulfonium chloride, dicyclohexyldialkylphosphonium iodide, benzyltrimethylammonium thiocyanate, and the like, and mixtures thereof.

The amount of the above-noted unsaturated epoxide and acid to be used in the reaction may vary over a wide range. In general, these reactants are used in approximately chemical equivalent amounts. As used herein and in the appended claims a chemical equivalent amount of the GMA refers to that amount needed to furnish one epoxy group per carboxyl group. Excess amounts of either reactant can be used. Preferred amounts range from about 0.5 to about 2 equivalents of carboxylic acid per equivalent of epoxide.

The amount of the catalyst employed may also vary over a considerable range. In general, the amount of the catalyst will vary from about 0.01% to about 3% by weight, and more preferably from about 0.3% to about 2% by weight of the reactants.

The reaction may be conducted in the presence or absence of solvents or diluents. In most cases, the reactants will be liquid and the reaction may be easily effected without the addition of solvents or diluents. However, in some cases, whether either or both reactants are solids or viscous liquids it may be desirable to add diluents to assist in effecting the reaction. Examples of such materials include the inert liquids, such as inert hydrocarbons as xylene, toluene, cyclohexane and the like.

If solvents are employed in the reaction and the resulting product is to be used for coating purposes, the solvent may be retained in the reaction mixture. Otherwise, the solvent can be removed by any suitable method such as by distillation and the like. If the product is to be stored for a prolonged time after its formation, it may also be desirable to remove the catalyst used in the preparation, such as by stripping, neutralization and the like.

Temperatures employed in the reaction will generally vary from about 50° C. to about 150° C. In most cases, the reactants will combine in the presence of the new catalyst at a very rapid rate and lower temperatures will be satisfactory. Particularly preferred temperatures range from about 60° C. to about 120° C.

The reaction will be preferably conducted at atmospheric pressure, but it may be advantageous in some cases to employ subatmospheric or superatmospheric pressures.

The course of the reaction may be conveniently followed by determination of the acidity. The reaction is considered to be substantially complete when the acidity has been reduced to about 0.015 eq/100 grams or below.

The process of the invention may be affected in any suitable manner. The preferred method merely comprises adding the GMA and polyacid, catalyst, and solvent or diluent if desired, in any order and then applying the necessary heat to bring about the reaction. The reaction mixture may then be distilled or stripped to remove any of the unnecessary components, such as solvent, catalyst, excess reactants and the like.

The polyester products obtained by the above process will vary from liquids to solid resins. The products will possess a plurality of free OH groups and a plurality of ethylenic groups. The products will be of higher molecular weight than the basic polyacid from which they are formed and will possess at least more than one ester group per polyacid unit.

These polyester acrylic resins may then be modified, if desired, by further reaction with a isocyanate or polycarboxylic acid anhydride such as maleic anhydride.

The resulting polyester acrylic resin may be mixed or blended with one or more compatible unsaturated monomers, examples of such monomers include, among others, aromatic compounds such as styrene, alpha-methylstyrene, dichlorostyrene, vinyl naphthalene, vinyl phenol and the like, unsaturated esters, such as acrylic and methacrylic esters, vinyl laurate, and the like, unsaturated acids, such as acrylic and alpha-alkylacrylic acids, butenoic acid, allylbenzoic acid, vinylbenzoic acid, and the like, halides, such as vinyl chloride, vinylidene chloride, nitriles, such as acrylonitrile, methacrylonitrile, diolefins, such as butadiene, isoprene, methylpentadiene, esters of polycarboxylic acids, such as diallyl phthalate, divinyl succinate, diallyl mateate, divinyl adipate, dichloroallyl tetrahydrophthalate, and the like, and mixtures thereof.

The amount of unsaturated monomer will vary widely; however, the weight ratio of polyester acrylic polymer to unsaturated monomer will generally vary from about 100.0:0.0 to about 30.0:70.0, with from about 90.0:10.0 to about 40.0:60.0 being preferred, and from about 80.0:20.0 to 50.0:50.0 being especially preferred.

Especially preferred unsaturated comonomers are the aromatic unsaturated compounds such as styrene, vinyl toluene and divinyl benzene. Since styrene or other polymerizable, vaporizable, ethylenically unsaturated monomer is a volatile component which tends to be released to the atmosphere during storage and/or curing of the thermosetting vinyl ester and unsaturated polyester resins, it is becoming more and more desirable to reduce the level of styrene or other polymerizable, vaporizable monomer which is released to the atmosphere during storage and/or cure. If acrylic oligomer, such as SR 239, SR306 from Sartomer, is used as monomer it is possible to obtain zero VOC gel coat.

The stabilizers are used to stabilize the resins during storage. Suitable stabilizers include the sterically hindered phenols, sulfides and amines. Examples of especially preferred stabilizers include, among others, 2,6 di-tertiary butyl-4-methylphenol, 1,3,5-trimethyl-2,4,6-tri(3',5'-di-tertiarybutyl-4'-hydroxybenzyl)benzene, octadecyl 3-(3',5'-di-tertiary butyl-4'-hydroxyphenyl)propionate, 4,4'-methylene bis(2,6-di-tertiary butylpheonol), zinc dibutyl dithiocarbamate. Exceptional color stability is achieved with these sterically hindered phenols. The hydroquinone is preferably added during the esterification step but may be added at any time and the stabilizer is preferably added to the finished vinyl ester or vinyl ester/styrene blend.

In general, the amount of each stabilizer employed in the blend will vary widely. Accordingly, a stabilizing amount consistent with the end color desirable is employed. Operable amounts usually range from about 2 to about 400 ppm of hydroquinone and from about 2 to about 600 ppm of the stabilizer, based on the weight of the resin. A very effective amount is from about 50 to about 250 ppm of hydroquinone and from about 50 to about 500 ppm of stabilizer. The amount of any additional gellation inhibitor may vary widely and may range from about 100 to about 10,000 ppm.

The resulting stabilized polyester acrylic resins can be converted to very suitable coating with the addition of a curing agent or use of UV-radiation.

Examples of suitable thermosetting resin curing agents (catalysts) are the free-radical yielding compounds and suitable radiation. Examples of such catalysts includes the peroxides, such as benzoyl peroxide, tertiary butyl hydroperoxide, ditertiary butyl peroxide, hydrogen peroxide, potassium persulfate, methyl cyclohexyl peroxide, cumene hydroperoxide, acetyl benzoyl peroxide. Tetralin hydroperoxide, phenylcyclohexane hydroperoxide, tertiary butylisopropylbenzene hydroperoxide, tertiary butylperacetate, tertiary butylacetate, tertiary butyl perbenzoate, ditertiary amyl perphthalate, ditertiary butyl peradipate, tertiary amyl percarbonate, and the like, and mixtures thereof; azo compounds such as 2,2'-azobisisobutyronitrile, dimethyl 2,2'-azobisisobutyrate, 2,2'-azobis(2,4-diamethylvaleronitrile, 2,2'-azobisisotulyamide, and the like. Particularly preferred catalysts include the diaroyl peroxide, tertiary alkyl hydroperoxides, alkyl peresters of percarboxylic acids and particularly those of the above noted groups which contain no more than 18 carbon atoms per molecular and have a decomposition temperature below 125° C.

Of course, other materials may be mixed or added, including, plasticizers, stabilizers, extenders, oils, resins, tars, asphalts, pigments, reinforcing agents, thioxotropic agents, and the like.

The present resin compositions may be utilized in many applications such as for coatings and reinforced composite products, such as laminated products, filament windings, sheet molding compounds (SMC). A very suitable application is in the preparation of gel coat with good hydrolytic stability and weather resistance. The gel coat composition of the present invention is preferably comprised of at least one polymer as described above combined with fillers, pigments, thixotropic agents, and other additives, etc.

Preferred thixotropic agents in the gel coat compositions according to this invention include silica, such as fumed silica and precipitated silica, silica gels, and bentonite clays. The thixotropei is preferably present in an amount of at least about 1 wt %, more preferably at least about 1.5 wt %, up to about 5 wt %, more preferably up to 3.5 wt %, based on the total weight of the gel coat composition.

Examples of fillers include clay, magnesium oxide, magnesium hydroxide, calcium carbonate, calcium silicate, mica, aluminum hydroxide, barium sulfate, talc, etc. Fillers are defined herein as not including the thixotropes as defined above, as well as coloring pigments. Preferred amounts of filler are in the range from 5 to 30 wt %.

In a preferred embodiment, the gel coat may be made by high speed dispersion of thixotrope and fillers into the above resin solution. A synergist package is then added. A free radical initiator is then added which will facilitate the formation of free radicals necessary for curing the gel coat composition. Lastly, a vinyl monomer is added to the gel coat composition until the desired viscosity is obtained.

In one embodiment of this invention, the free radical initiator is a photoinitiator, and the gel coat composition is cured by UV radiation. These include photoinitiators such as benzophenone, acetophenone and its derivatives, benzoin, benzoin ethers, thioxanthones, halogenated compounds, oximes, and acyl phosphine oxides. Preferred are those photoinitiators which do not strongly discolor when exposed to sunlight, e.g. the acyl phosphine oxides and 2-hydroxy-2-methyl-1-phenylpropan-1-one.

In another embodiment of the gel coat composition of the invention, a thermally activated cure system is employed, such as a system comprising a metal catalyst and a nonpolyallylic peroxide initiator. In a preferred embodiment of this invention, the thermally activated free radical initiator is an oxidation/reduction system. The oxidation/reduction system comprises a metal catalyst and any combination of one or more compounds selected from the following: amines, alkyl acetoacetates, alkyl acetoacetamides, and alkyl and aryl acetanilides. The gel coat composition may be cured by heat (typically induced by infrared (IR) radiation). The cure temperature is preferably less than 40° C., more preferably less than 30° C.

The metal catalyst is any metallic salt that will promote or accelerate the rate of cure of the gel coat composition. Typically, these catalysts are salts of metals and organic acids. Representative metals are cobalt, manganese, vanadium, potassium, zinc and copper. The metal catalyst includes, among others, a variety of metal driers. Preferred metallic salt driers include the octoates, napthenates and neodeconates of cobalt, manganese, vanadium, potassium, zinc and copper. An especially preferred catalyst is cobalt octoate solution in an amount preferably in the range from about 0.012 to 0.036 wt % of cobalt (e.g., 0.1 to 0.3% wt % of a 12% cobalt octoate solution may be used).

The oxidation/reduction system also contains any combination of one or more compounds selected from the following: amines, alkyl acetoacetates, alkyl acetoacetamides, and alkyl and aryl acetanilides. For example, dimethyl aniline is added in an amount preferably in the range from 0 to 0.4 wt %, more preferably 0.1 to 0.4 wt %. Dimethyl acetoacetate and/or ethyl acetoacetate and/or methyl acetoacetate and/or acetoacetanilide, etc. may be added preferably, in an amount ranging from 0 to 0.2 wt %, more preferably 0.05 to 0.15 wt %, to the oxidation/reduction system.

In a preferred embodiment of this invention, a peroxide based co-initiator is used, more preferably in conjunction with the oxidation/reduction system, to cure the gel coat and the laminating resin. These co-initiators are typically non-polyallylic peroxides. They include any of the common peroxides such as benzoyl peroxide; dialkyl or aralkyl peroxides such as di-t-butyl peroxide, dicumyl peroxide, cumylbutyl peroxide, 1,1-di-t-butyl-peroxy-3,5,5-trimethylcyclohexane, 2,5-dimethyl-2,5-di-t-butylperoxy hexane and bis(alpha-t-butylperoxy isopropylbenzene); dialkanoyl peroxides such as 2,5-dimethyl-2,5-di(2,5-diethylhexanoyl peroxy)hexane; peroxyesters such as t-butylperoxy pivalate, t-butyl peroctoate, t-butyl perbenzoate, 2,5-dimethylhexyl-2,5-di(perbenzoate), dialkylperoxymonocarbonates and peroxydicarbonates; hydroperoxides such as t-butyl hydroperoxide, p-methane hydroperoxide, pentane hydroperoxide and cumene hydroperoxide; and ketone peroxides such as cyclohexanone peroxide and methyl ethyl ketone peroxide. Typically, a methyl ethyl ketone peroxide (MEKP) co-initiator is used which consists of a solution blend of various peroxides and hydroperoxides, including monomer MEKP, dimer MEKP, cyclic trimer MEKP, and hydrogen peroxide, in an inert carrier such as dibutyl phthalate.

Other methods of curing the gel coat are possible and will be apparent to one skilled in the art. The cured gel coat preferably has a Gardner color of about 2 or less, more preferably about 1 or less, on the Gardner-Holt color scale from 0 to 18 measured according to ASTM D 1544.

The gel coating process is well known in the art. The gel coat composition is applied to the surface of a mold and allowed to partially cure. If the gel coat composition contains a photoinitiator as the free radical initiator, then the gel coat composition is exposed to radiation having the appropriate wavelength and intensity to activate the photoinitiator. If the gel coat composition contains a thermally activated fee radical initiator, then the gel coat composition is exposed to heat, preferably in the form of IR radiation. The partially cured gel coat composition is relatively soft, possibly even tacky.

An article to be gel coated is applied to the partially cured gel coat composition to form a laminate and the laminate undergoes a second stage cure. This second stage cure may be carried out by heating the mold to an elevated temperature or by other means, such as irradiation. Afterwards, the gel coated article is removed from the mold. The gel coat becomes an integral part of the finished laminate and is usually used to improve surface appearance. This process is described in more detail in Lubin, Handbook of Composites p. 764, Van Nostrand Reinhold Company (1982), which is incorporated herein by reference.

In some embodiments, the gel coat can be coated on a composite molded substrate made from either a resin composition according to the invention or from unsaturated polyester resins (UPR) or vinyl esters or an other thermosetting resin. The article to be gel coated may be fully or partially cured polymer resin or composite of reinforcing material in a polymer resin matrix. The reinforcing material may be selected from any conventionally used in the composite plastics industry, such as glass fiber, polyethylene fiber, carbon fiber, metal fiber, ceramic fiber, etc., and the resin may be selected from a wide range of resins, such as polyester resins, epoxy resins, polyester carbonate resins, polycarbonate resins, polystyrene resins, polymethyl-methacrylate resins, etc. The mold surface preferably corresponds to the shape of the article in negative relief. It may be an open mold or a matched mold.

The examples which follow are illustrative of the present invention. They are not to be taken as limiting the scope of the claimed invention. Unless stated otherwise, all percents and ratios of amounts are by weight.

Description of Testing Methods

Panel Preparation

Methyl ethyl ketone peroxide (MEKP) (1.8 wt %) is added to the gel coat and stirred for 1 minute. The gel coat is then sprayed onto a waxed and buffed flat tempered glass plate to a thickness of 15-40 MILS (1 MIL-0.001 inch). After curing for 1-2 hours, an ⅛" laminate is made using chopped fiberglass and a polyester resin (40% mat/60% resin). Methyl ethyl ketone peroxide (MEKP) co-initiator at 1.2 wt % is used to cure the polyester resin. The laminate is allowed to cure for 16-20 hours, then removed from the mold and cut into test parts.

Boiling Water Resistance

A 7"×7" part from the above panel is connected to a boiling water tank, using deionized water, (ANSI Z124) and exposed for 100 hours. The exposed panels are then rated on a scale of 0-5 for blisters, color change, change in fiber prominence, cracks, and loss of visible gloss with 0=no change, and 5=maximum change.

QUV Weathering

Test panels are also subjected to the weathering test procedure (ASTM 53, incorporated herein by reference) using the cycle of 4 hours condensation at 40° C., followed by 4 hours exposure at 60° C. to a UV bulb with a peak energy of 340 nm. Test panels are inspected at 500 hour intervals.

Rheology, Brookfield Viscometer

The thixotropy of the gel coat is determined by use of a Brookfield Viscometer. An 8 oz. jar of gel coat at 77 F. is used as a test sample. Using a #4 spindle on the viscometer the viscosity is measured at 2 and 20 rpm. The thixotropic index is calculated as the ratio of the viscosity at 2 rpm to the viscosity at 20 rpm.

Comparative Example 1

Preparation of a Conventional Isophthalic Neopentyl Glycol Unsaturated Polyester Resin In a reactor equipped with a stirrer, thermometer, a water separating column fitted with a reflux condenser, and a nitrogen inlet, the following ingredients are added:

| Components | Grams |
| --- | --- |
| Neopentyl Glycol | 1840 |
| Propylene Glycol | 1042 |
| Isophthalic Anhydride | 2270 |
| Maleic Anhydride | 1594 |

The charged mixture is following a two-stage process and a total of 539 parts of water are distilled off. The reaction mixture is held at 220° C. until an acid number of 15-20 is obtained. The reaction mixture is then cooled to less than 140° C. and the following ingredients are added:

| Components | Grams |
| --- | --- |
| Methoxyhydroquinone | 0.9 |
| Styrene | 2700 |

Comparative Example 2

Preparation of a Conventional Gel Coat

A gel coat is prepared by blending the following ingredients:

| Components | Grams |
| --- | --- |
| Resin solution from Comparative Example 1 | 48.0 |
| 12% Cobalt drier | 0.2 |
| Amorphous-Fumed Silica | 1.3 |
| Air release | 0.45 |
| Fillers | 21.6 |
| Styrene | 13.5 |
| Methyl methacrylate | 4.7 |
| Sorbitan Monolauarate | 0.25 |
| Pigment paste | 10.0 |

The resulting coating can then be cured by adding a 1.8 wt % MEKP co-initiator and spraying the coating on a glass mold as described in the Test Panel Preparation.

Unless otherwise specified herein, the term "viscosity" refers to the viscosity of a polymer in styrene monomer at 70 wt. % NVM (non-volatile material, see below) at 25° C. measured using a Brookfield Viscometer.

In a preferred embodiment, the low VOC vinyl ester resin of this invention have a viscosity not greater than about 1000 cp, when the resin is dissolved in 30 wt. % styrene based on the total weight of resin and styrene.

The term "NVM" refers to non-volatile material dispersed in a volatile substance (e.g., styrene monomer) measured according to ASTM D1259.

The following examples (Examples 1-5) show the preparation of various acrylic polymers.

Example 1

Preparation of Polyester Acrylic Resin

Into a two-liter flask equipped with stirrer, thermometer, nitrogen introducing tube and condenser were placed 427 grams of polycaprolactone triol (Tone™ polyol 0301, Dow Chemical) and 680 grams of hexahydrophthalic anhydride. The temperature was raised to 115° C. and kept at that temperature for 3 hours. Then 650 grams of glycidyl methacrylate, 0.2 grams of 2,3,5-trimethylhydroquinone and 0.8 grams of benzyltriethylammonium chloride (TEBAC) were added, the reactor's atmosphere is changed from nitrogen to nitrogen with 5% oxygen and the temperature raised to 115° C. and held at that temperature until the acid number was below 20. Then 732 grams of styrene monomer and 0.2 grams of toluhydroquinone were added. The resulting vinyl ester resin had a viscosity of 350 cp (70% wt solid content in styrene).

Example 2

Preparation of Polyester Acrylic Resin 1757 grams of the polyester acrylic resin from Example 1 before the addition of styrene monomer were prepared. Then 732 grams of 1,6-hexanediol dimethacrylate monomer (SR239 from Sartomer) and 0.2 grams of toluhydroquinone were added. The resulting vinyl ester resin had a viscosity of 1950 cp (70% wt solid content in acrylic monomer).

Example 3

Preparation of Urethane Modified Polyester Acrylic Resin

Into a two-liter flask equipped with stirrer, thermometer, nitrogen introducing tube and condenser were placed 427 grams of polycaprolactone triol (Tone™ polyol 0301, Dow Chemical) and 680 grams of hexahydrophthalic anhydride. The temperature was raised to 115° C. and kept at that temperature for 3 hours. Then 650 grams of glycidyl methacrylate, 0.2 grams of 2,3,5-trimethylhydroquinone and 0.8 grams of benzyltriethylammonium chloride (TEBAC) were added, the reactor's atmosphere is changed from nitrogen to nitrogen with 5% oxygen and the temperature raised to 115° C. and held at that temperature until the acid number was below 20. Then 102 grams of isophorone diisocyanate (IPDI, Bayer) was added and held at 90° C. for 1 hour. Then 732 grams of styrene monomer and 0.2 grams of toluhydroquinone were added. The resulting vinyl ester resin had a viscosity of 880 cp (70% wt solid content in styrene).

Example 4

Preparation of Polyester Acrylic Resin

Into a two-liter flask equipped with stirrer, thermometer, nitrogen introducing tube and condenser were placed 92 grams of ethanolamine and 153 grams of propylene carbonate (Huntsman) was added by dropping in 20-35° C. The reaction is held at 35° C. for two hours after the addition time period then 663 grams of hexahydrophthalic anhydride was added. The temperature was raised to 115° C. and kept at that temperature for 3 hours. Then 632 grams of glycidyl methacrylate, 0.2 grams of 2,3,5-trimethylhydroquinone and 0.8 grams of benzyltriethylammonium chloride (TEBAC) were added, the reactor's atmosphere is changed from nitrogen to nitrogen with 5% oxygen and the temperature raised to 115° C. and held at that temperature until the acid number was below 20. Then 652 grams of styrene monomer and 0.2 grams of toluhydroquinone were added. The resulting vinyl ester resin had a viscosity of 250 cp (70% wt solid content in styrene).

Example 5

Preparation of Polyester Acrylic Resin

Into a two-liter flask equipped with stirrer, thermometer, nitrogen introducing tube and condenser were placed 354 grams of tris-2-hydroxyethyl isocyanurate (THEIC), 233 grams of caprolactone and 0.2 grams of dibutyltin dilaurate. The temperature was raised to 160° C. and kept at that temperature for 3 hours. Then 646 grams of hexahydrophthalic anhydride was added. The temperature was reduced to 115° C. and kept at that temperature for 3 hours. Then 618 grams of glycidyl methacrylate, 0.2 grams of 2,3,5-trimethylhydroquinone and 0.8 grams of benzyltriethylammonium chloride (TEBAC) were added, the reactor's atmosphere is changed from nitrogen to nitrogen with 5% oxygen and the temperature kept at 115° C. and held at that temperature until the acid number was below 20. Then 786 grams of styrene monomer and 0.2 grams of toluhydroquinone were added. The resulting vinyl ester resin had a viscosity of 380 cp (70% wt solid content in styrene).

The viscosity and typical physical properties of resins prepared in Examples 1 to 5 are listed in Table 1. All resins are 70% NVM for viscosity and physical properties measurement. The physical property measurements were done on the clear casting of the resulting polyester acrylic resin from each example.

TABLE 1

Viscosity and Physical Properties of Polyester Acrylic Resins

| | Resin Example | | | | |
|---|---|---|---|---|---|
| | 1 | 2 | 3 | 4 | 5 |
| Viscosity (cps) | 350 | 1950 | 880 | 250 | 380 |
| Tensile Strength (psi) | 11490 | 8500 | 11990 | 13370 | 12400 |
| Elongation | 4.71% | 2.46% | 5.10% | 2.50% | 4.39% |
| Flexural Strength (psi) | 19870 | 14280 | 21110 | 23480 | 20710 |
| HDT (° C.) | 86 | 103 | 92 | 88 | 74 |

Example 6

Preparation of a Polyester Acrylic Gel Coat

A gel coat is prepared by blending the following ingredients:

| Components | Grams |
|---|---|
| Acrylic Resin Solution from Example 1 | 69.27 |
| Fillers | 10.0 |
| Amorphous-Fumed Silica | 1.8 |
| Air release agent | 0.45 |
| 12% Cobalt drier | 0.18 |
| Ethylene Glycol | 0.2 |
| Styrene | 8.1 |
| Pigment paste | 10.0 |

QUV Weathering Comparison Between Gel Coats in Comparative Example 1B and Example 1B of the Present Invention

| Gel Coat | Hours | dE | dGloss |
|---|---|---|---|
| Comparative Example 2 | 500 | 2.00 | −3.0 |
| | 1000 | 3.86 | −5.0 |
| | 1500 | 7.00 | −13.0 |
| Example 6 | 500 | 0.82 | −6.0 |
| | 1000 | 1.50 | −7.0 |
| | 1500 | 2.87 | −11.0 |

Boil Test Comparison Between Gel Coats in Comparative Example 2 and Example 6 of the Present Invention

| | Comparative Example 2 | Example 6 |
|---|---|---|
| Blisters | 1.58 | 2.00 |
| Color Change | 1.83 | 0.67 |
| Fiber Prominence | 0.50 | 0.67 |
| Cracks | 0.00 | 0.00 |
| Loss of Gloss | 0.33 | 0.33 |
| Total | 4.24 | 3.67 |

Rheology, Brookfield Viscometer

Viscosity measurements obtained using a Brookfield viscometer of a gel coat similar to Comparative Example 1B are as follows:

| RPM Viscosity (cps) | Comparative Example 2 | Example 6 |
|---|---|---|
| 2 | 20300 | 19500 |
| 4 | 12500 | 10850 |
| 20 | 3500 | 3260 |
| Thixotropic Index | 5.8 | 6.0 |

The new acrylic resin has a VOC around 30%, which meets the new MACT standard of styrene emissions for marine industry. The resin example 2 also showed it is possible to obtain a zero VOC resin with a viscosity less than 2000 cps with 30% HDMA monomer.

Although the process of this invention has been described in considerable detail by the preceding examples, this detail is for the purpose of illustration only and is not to be construed as a limitation on the spirit and scope of the invention as described in the appended claims.

What is claimed is:

1. A thermosetting, crosslinkable resin composition suitable for preparing a gel coat, the composition comprising:
a polyester acrylic polymer having an average of more than two polymerizable carbon-carbon double bonds in each molecule, the carbon-carbon double bonds in the polyester acrylic polymer being from a reaction product of a saturated polyacid half-ester having an average acid functionality of 2 or more and an unsaturated epoxide monomer in about chemically equivalent amounts to furnish one epoxy group per carboxyl group, the saturated polyacid half-ester being the reaction product of one or more polyols having an average of at least two hydroxyl groups in the molecule with one or more saturated polycarboxylic acids or acid anhydrides; the polyester acrylic polymer containing less than 10 weight % aromatic content and having a number average molecular weight of 560-2500 and a viscosity less than 1500 cps at 70 wt. % NVM solids dispersed in 30 wt. % styrene based on the total weight of the polymer and the styrene; the polyester acrylic polymer blended with a polymerizable vinyl monomer.

2. The resin composition of claim 1, wherein the unsaturated epoxide monomer is selected from the group consisting of glycidyl acrylate, glycidyl methacrylate, and allyl glycidyl ether.

3. The resin composition of claim 1, wherein the polyol has a hydroxyl number of from about 130 to 1200, and a number average molecular weight between about 190 and 1800.

4. The resin composition of claim 1, wherein the polyol is selected from the group consisting of polyols which contain 2 to 20 carbon atoms, and polymeric polyols selected from the group consisting of polyester polyols, polyurethane polyols, polyether polyols and acrylic polyols, and mixtures thereof.

5. The resin composition of claim 1, wherein the saturated polycarboxylic acid or acid anhydride, exclusive of the carbon atoms and anhydride moiety, contains from 2 to 20 carbon atoms.

6. The resin composition of claim 1, wherein the polyester acrylic polymer has free secondary OH groups and unsaturated acrylate ester linkages.

7. The resin composition of claim 1, wherein the polymerizable vinyl monomer is selected from the group consisting of aromatic compounds, unsaturated esters, unsaturated acids, halides, nitriles, diolefins, esters of polycarboxylic acids, and mixtures thereof.

8. A process for making a polyester acrylic polymer having an average of more than two polymerizable carbon-carbon double bonds in each molecule, comprising:
   a. Preparing a saturated polyacid half-ester having an average acid functionality of 2 or more by reaction of a polyol with a saturated polycarboxylic acid or acid anhydride, the polyol having an average of at least two hydroxyl groups in the molecule, a hydroxyl number of from about 56 to 1830 and an average molecular weight of from about 92 to about 2,000; and
   b. Esterification of the saturated polyacid half-ester with an unsaturated epoxide monomer in about chemically equivalent amounts to furnish one epoxy group per carboxyl group to produce the polyester acrylic polymer having said carbon-carbon double bonds, being from reaction of the saturated polyacid half-ester with the unsaturated epoxide monomer, the polyester acrylic polymer containing less than 10 weight % aromatic content.

9. The resin composition of claim 1, wherein the resin composition further comprises a pigment.

10. A gel coat comprising the resin composition according to claim 1, wherein the gel coat is combined with an initiator and coated on a composite molded substrate comprising a material selected from the group consisting of the resin composition according to claim 1, unsaturated polyester resins (UPR), and vinyl esters.

11. An article having a gel coat thereon, the gel coat comprising the resin composition of claim 1 being partially or fully crosslinked.

12. The resin composition of claim 1, wherein the composition comprises a weight ratio of the polyester acrylic polymer to the polymerizable vinyl monomer of about 90:10 to about 40:60.

13. The resin composition of claim 1, wherein the polyester acrylic polymer has a number average molecular weight of 800-2000, and a viscosity of less than 1000.

14. The resin composition of claim 1, wherein the polyol has a hydroxyl number of from about 56 to 1830, and a number average molecular weight between about 92 and 2000.

15. The resin composition of claim 5, wherein the saturated polycarboxylic acid anhydride is selected from the group consisting of aliphatic anhydrides, cycloaliphatic anhydrides, and substituted aliphatic anhydrides.

16. The resin composition of claim 6, wherein the free secondary OH groups of the polyester acrylic polymer are reacted with a diisocyanate, polyisocyanate, or isocyanate functional prepolymer.

17. The resin composition of claim 7, wherein the polymerizable vinyl monomer is selected from the group consisting of styrene, alpha-methylstyrene, dichlorostyrene, vinyl naphthalene, vinyl phenol, acrylic and methacrylic esters, vinyl laurate, acrylic acids, alpha-alkylacrylic acids, butenoic acid, allylbenzoic acid, vinylbenzoic acid, vinyl chloride, vinylidene chloride, acrylonitrile, methacrylonitrile, butadiene, isoprene, methylpentadiene, diallyl phthalate, divinyl succinate, diallyl maleate, divinyl adipate, dichloroallyl tetrahydrophthalate, and mixtures thereof.

18. The process of claim 8, wherein the carboxylic acid anhydride has at least one intramolecular carboxylic anhydride group.

19. The resin composition of claim 1, wherein the acid to hydroxyl molar ratio is at least about 1.6.

20. The resin composition of claim 1, wherein the saturated polyacid half-ester is the reaction product of the polyol and the saturated polycarboxylic acid or acid anhydride at an equivalent ratio of anhydride to hydroxyl on the polyol of at least about 0.8:1 or at a molar ratio of acid to hydroxyl on the polyol of at least about 1.6:1.

21. The resin composition of claim 1, wherein the saturated polyacid half-ester has an average acid functionality of more than 2.

22. The resin composition of claim 1, further comprising an initiator.

* * * * *